United States Patent [19]

Horikawa et al.

[11] 4,206,324

[45] Jun. 3, 1980

[54] PIVOTED PLURAL MICROPHONE ASSEMBLY

[75] Inventors: Norikazu Horikawa, Chofu; Motoyoshi Nagafuji, Tokyo, both of Japan

[73] Assignee: Sony Corporation, Tokyo, Japan

[21] Appl. No.: 929,342

[22] Filed: Jul. 31, 1978

[30] Foreign Application Priority Data

Aug. 22, 1977 [JP] Japan .................................. 52-100269

[51] Int. Cl.² .......................... H04M 1/12; H04R 5/00

[52] U.S. Cl. .................................... 179/150; 179/1 G; 179/152

[58] Field of Search ............... 179/147, 148 R, 148 F, 179/149, 150, 146 R, 1 G, 1 GA, 152

[56] References Cited

U.S. PATENT DOCUMENTS 2,791,628 5/1957 Edmonson ........................... 179/1 G

*Primary Examiner*—George G. Stellar

*Attorney, Agent, or Firm*—Hill, Van Santen, Steadman, Chiara & Simpson

[57] ABSTRACT

A novel microphone assembly including three microphones which are rotatably or pivotably supported relative to each other and relative to a supporting handle housing structure wherein the left and right microphones rotate the same amount relative to a center axis of the microphone structure and wherein the center microphone can be extended different lengths and directed in different directions so as to vary the mixing ratio relative to the other microphones and including a ganged variable resistor to which the center microphone is connected so as to automatically control the mixing ratio between the signal from the center microphone with the two outer left and right microphones. The microphone assembly can be folded into a compact package and the microphone has superior localization characteristics for reproduction of sound.

9 Claims, 7 Drawing Figures

PIVOTED PLURAL MICROPHONE ASSEMBLY

BACKGROUND OF THE INVENTION

1. Field of the Invention

The present invention relates to a microphone assembly including three microphones which can be folded into a compact arrangement and which has superior localization characteristics for reproduction of sound.

2. Description of the Prior Art

Microphone assemblies are known for stereophonic recording which include a pair of microphones which are fixed with a predetermined distance between them. Such prior art microphone assemblies require a separate support member instrument to render it suitable for recording sounds in outdoor environments where the microphone assembly must be frequently moved.

The prior art microphones comprising left and right microphones do not have highly accurate localization characteristics for indicating the direction of sound sources.

SUMMARY OF THE INVENTION

It is an object of the present invention to provide an improved microphone assembly which is free from the defects of the prior art and provides improved stereophonic recording of sound.

Another object of the invention is to provide a microphone assembly which includes three microphones that are rotatably supported by a supporting member in which the rotation angle can be adjusted.

A further object of the invention is to provide a microphone assembly including three microphones in which output signals from the microphone located in the center is added to the outputs of the microphones located at the left and right sides of the center microphone by a mixing means.

Still another object of the invention is to provide a microphone assembly in which a support member rotatably supports three microphones and is provided with a handle housing member which pivotably supports the support member and where the handle member, the microphones and the support member can be compactly folded when the microphone is not being used.

According to a feature of the present invention, there is provided a microphone assembly comprising a pair of left and right microphones and a center microphone supported between the pair of left and right microphones with a frame support member for supporting the pair of left and right microphones and the center microphones and a mixing circuit for combining the output signal from the center microphone with the output signals from the left and right microphones.

Other objects, features and advantages of the present invention will become apparent from the following description taken in conjunction with the accompanying drawings in which like numerals designate like elements.

DESCRIPTION OF THE PREFERRED EMBODIMENTS

Figure 1:
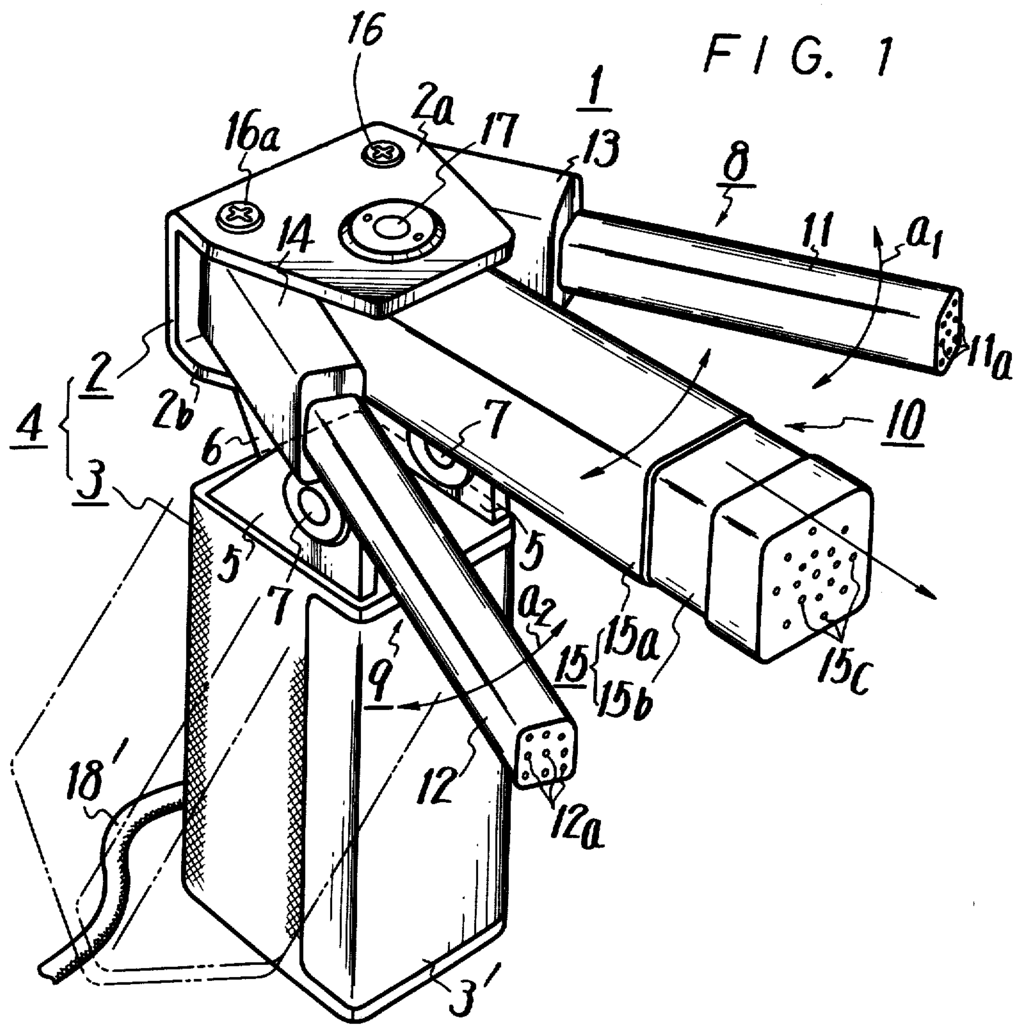
FIG. 1 is a perspective view illustrating the example of the microphone assembly of the present invention in the condition when the left and right microphones are rotated away from the center microphone to an extended position.

FIG. 1 illustrates the microphone assembly 1 of the multi-microphone invention. The microphone assembly includes a generally U-shaped frame member 2 which pivotably supports a center microphone 10 on shaft 17 as well as left and right microphones 8 and 9 which are pivotably supported on shafts 16 and **16*a*. A handle or housing member 3 has a pair of upwardly extending frame members 5 and 5*a* through which pivot shafts 7 and 7*a* extend so as to support the frame supporting member 2** for rotation about a horizontal shaft.

The handle or housing member 3 is formed as a hollow member with rectangular cross-section and the supporting plates 5 and **5*a* are attached to its upper surface. Pivotable supporting plates 6 are attached to the lower surface 2*b* of the supporting member 2 and the pivot shafts 7 and 7*a* extend through the plates 5, 6 and 5*a* and corresponding supporting plate 6 to support the microphone assembly on a horizontal axis. Although two pivot shafts 7 and 7*a* are illustrated, it is to be realized, of course, that a common shaft can replace the two shafts 7 and 7*a***.

Thus, means are provided wherein the frame supporting member 2 and the handle member 3 can be rotated relative to each other. The pivot points between these members are designed such that suitable rotational friction is provided to maintain the members 2 and 3 in any desired fixed rotated position from which they can be selectively moved.

FIG. 1 illustrates the handle or housing member 3 with its longitudinal axis substantially at right angles to the center microphone 10. However, it is to be realized that the microphones may be rotated about shafts 7 and **7*a* to the position illustrated in FIG. 2 wherein the microphones extend substantially parallel to the longitudinal axis of the handle 3 or, alternatively, the angle between the microphones and the longitudinal axis of the handle can be greater than 90° as illustrated in two-dot dash line illustrated in FIG. 1. Thus, in the two-dot dash line position illustrated in FIG. 1, if the handle member 3 is placed in the vertical position, the microphones 10, 8 and 9 will extend upwardly. The rotational position between the support member 2** and the handle can be adjusted to numerous selected positions.

The microphone 8 comprises the L or left channel microphone and the microphone 9 comprises the right or R channel microphone and they are pivotable about shafts 16 and **16*a* relative to the upper plate 2*a* and lower plate 2*b* of the supporting frame member 2** as shown by the arrows $a_1$ and $a_2$. The microphones 8 and 9 are interconnected by means to be described later such that they rotate relative to the plates *2a* and *2b* by the same angle. Thus, if the microphone 8 is moved counterclockwise relative to FIG. 1, microphone 9 will move clockwise the same angle. Alternatively, if the microphone 8 is moved clockwise relative to FIG. 1, the microphone 9 will move counterclockwise by the same angle. The central microphone 10 is also pivoted to the frame support member 2 between the upper and lower plates *2a* and *2b* on shaft 17 and is mounted between the left and right microphones 8 and 9. The left and right microphones 8 and 9 are respectively provided with extending microphone arms 11 and 12 each of which are of a predetermined length and are made of hollow rectangular shaped parallelpiped material. The free or outer ends of the microphone arms 11 and 12 are closed by covers which are formed with a plurality of apertures *11a* and *12a* selected to have suitable opening ratios and microphone pickup elements or units not shown are mounted near the closed ends within the microphone arms 11 and 12, respectively. The base portions of the microphones arms 11 and 12 adjacent the support member 2 are formed as pivotal chambers or portions 13 and 14 and amplifiers for the respective microphone units are mounted therein and an interlocking device which will be described later is provided so that both of the microphone arms 11 and 12 rotate by the same angle when either of them is rotated as described above.

As shown in FIG. 1, the center microphone 10 is provided with a microphone arm which is made of a rectangular hollow parallelpiped which is larger in section than the microphone arms 11 and 12. The center microphone arm consists of a larger end cross-section rectangular portion *15a* which is connected to the support 2 and a smaller in cross-section inner rectangular portion *15b* which is telescopingly and slidably mounted relative to the portion *15a*. The outer free end of the portion *15b* is covered by a cap or lid which has a number of apertures *15c* with a suitably selected opening ratio similar to the apertures *11a* and *12a*. A microphone pickup unit or element is mounted in the member *15b* near the openings *15c* and an amplifier for the microphone element is provided in the portion *15a* which is pivotably connected to the frame support member 2 at its inner end. As the portion *15b* is extended further outwardly from the shaft 17, the directivity of the microphone 10 becomes sharper and sharper which allows the microphone 10 to serve as a so-called gun type microphone. Also, under normal conditions, the directivity of the center microphone is selected to be sharper than the directivity of the left and right microphones 8 and 9.

The left and right microphones 8 and 9 are pivoted to the portions *2a* and *2b* by the screw shafts 16 and *16a* and the center microphone 10 is pivoted at its base portion to the frame member 2 by way of shaft 17. A microphone cord 18′ passes out from the handle portion 3 and is connected to the microphone elements or amplifiers (not shown). The handle member 3 has a front cover portion 3′.

Figure 2:
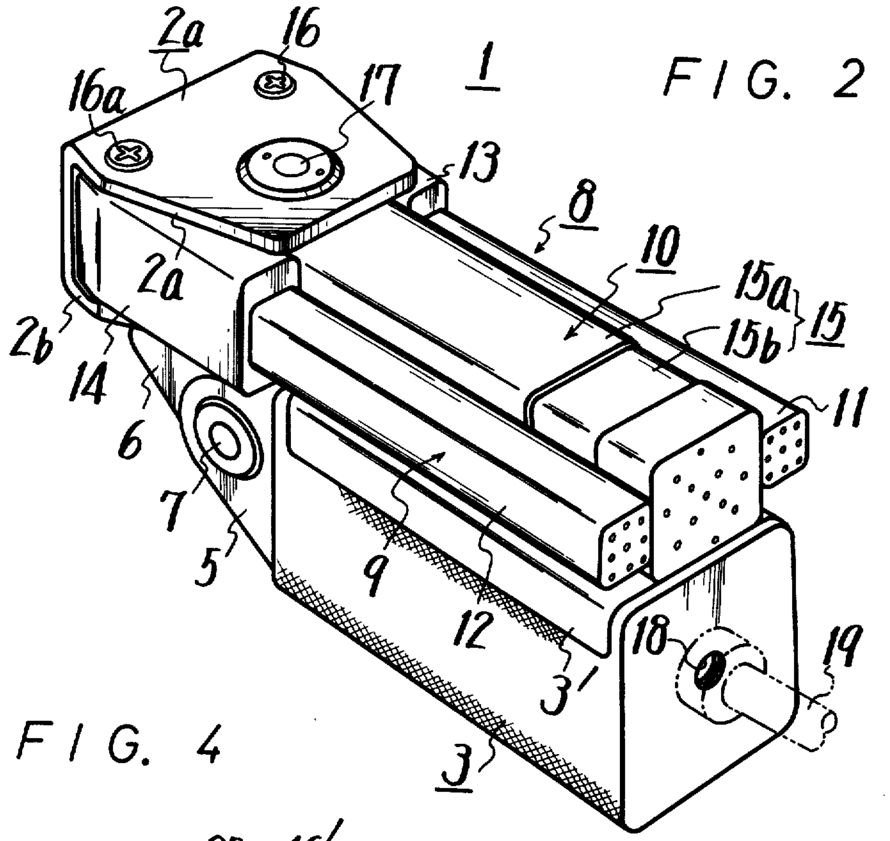
FIG. 2 is a perspective view illustrating the microphone assembly of the invention when it is folded into its compact stored position.

FIG. 2 is a perspective view of the microphone assembly 1 in its stored condition wherein the left and right microphones 8 and 9 have been rotated so as to be in contact with the center microphone 10 and with the handle 3 rotated about the shaft 7 so that the handle 3 engages the center microphone 10. It is to be noted that in this position the microphone assembly comprises a compact stored arrangement for easy portability or storing.

In the stored condition, the longitudinal axis of the antennas 8, 9 and 10 are parallel to the longitudinal axis of the handle 3 and the assembly can be placed in a small cover or case for transporting it.

The handle member 3 can serve as the microphone stand but in the event a floor stand or boom stand becomes necessary for recording a sound field, a female threaded collar 18 may be provided in the bottom surface of the handle as illustrated in FIG. 2 for receiving a threaded shaft 19 indicated in two-dot chain line in FIG. 2 for connecting the antenna assembly to the floor stand or boom.

In the microphone assembly of the present invention, an interlocking device is provided so that the left and right microphones 8 and 9 rotate by the same angle away from or toward the longitudinal axis of the handle 3 such that when either of the microphone arms 11 and 12 of the left and right microphones 8 and 9 is opened or rotated for example, by 60° the directional angle between the left and right microphone arms 11 and 12 will be 120°. Thus, with such an opening angle stereophonic sound recording can be accomplished which is ordinarily recognized by the factors of level, time and phase differences between the sound waves.

The center microphone 10 is utilized so as to make the localization of stereophonic sound fields more distinct and clear. In other words, so as to assure that the center microphone 10 corresponds to the selecting capability of a human ear, the center microphone is directed to a specific sound source in the sound field for example, so as to follow the sound source or in order to actively vary a sound source image during the sound recording and the direction of the center microphone is selected so that it can be suitably varied within a range between the left and right side microphones.

Figure 3:
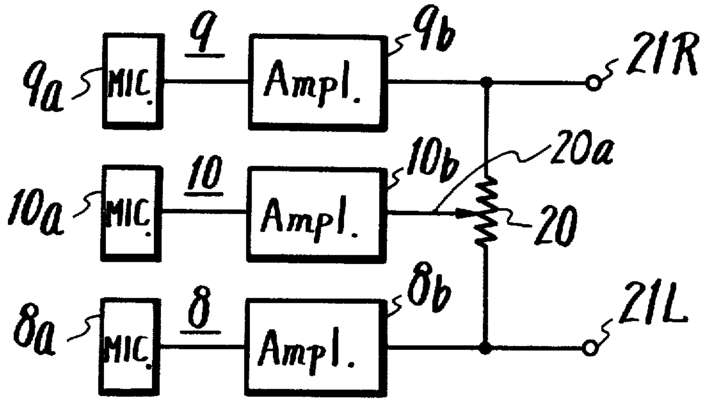
FIG. 3 comprises an electrical block diagram illustrating the electrical connection between the microphones.

FIG. 3 illustrates the microphone element *10a* of the center microphone 10 and the microhpone elements *8a* and *9a* of the left and right microphones 8 and 9 and shows their interconnections. The microphones *8a*, *10a* and *9a* are respectively connected to the amplifiers *8b*, *10b* and *9b*. The output of amplifier *10b* is connected to terminal 21R which represents the right stereo output. The output of amplifier *8b* is connected to terminal 21L which represents the left stero output. A potentiometer 20 has its resistive element connected between terminals 21R and 21L and the amplifier *10b* is connected to a wiper contact *20a* which makes electrical contact with the resistance of the potentiometer 20 and is adjustable relative thereto. This arrangement provides that the left and right microphone elements *8a* and *9a* are connected in parallel to the microphone element *10a* of the center microphone 10 which is very sharply directed and the output signal from the center microphone 10 will be distributed to the left and right output terminals 21L and 21R according to the rotational angle of the center microphone 10 relative to the center bisector of the angle determined by the microphone arms 11 and 12. For example, when the center microphone 10 is rotated closer to the left microphone 8 for the purpose of recording the left side sound in the sound field the sound volume of the left microphone 8, the sound volume of the left microphone 8 will contribute a smaller percentage of the total signal at terminal 21L than when the microphone 10 is in the center between the microphones 8 and 9. Thus, the localization of the sound source can be increased by moving the center microphone 10 and, hence, the output signals from the left and right microphones 8 and 9 especially the output signal from the left microphone 8 become the so-called atmospheric sound. In actual practice, the final stereophonic output signal is produced by the use of a mixing circuit which will be described later herein.

Figure 4:
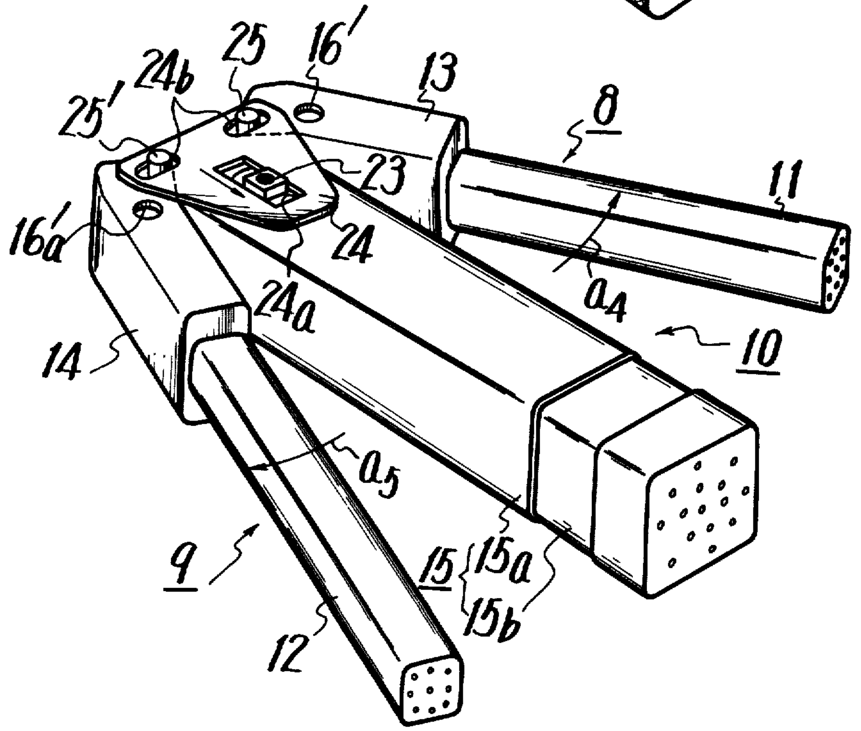
FIG. 4 is a perspective view of the invention illustrating the ganging together and interlocking operation between the left and right microphones.
Figure 5:
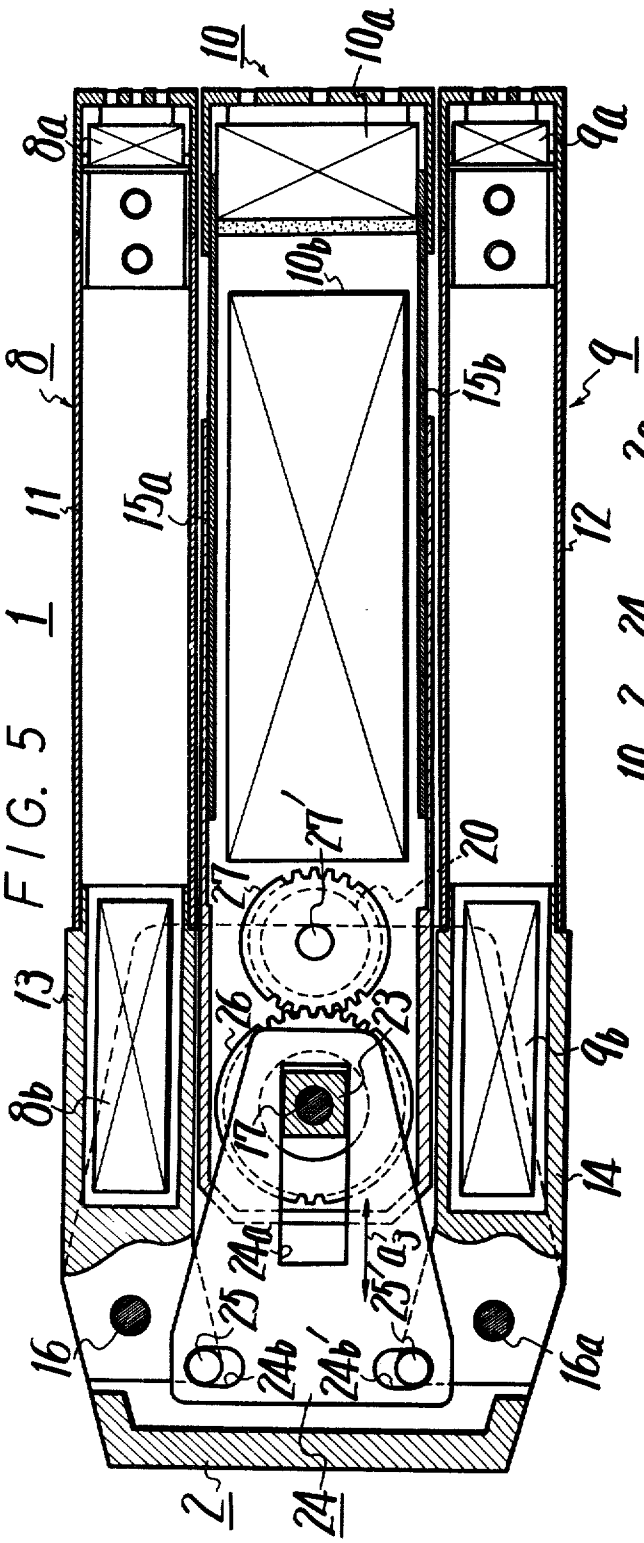
FIG. 5 is a sectional view in an enlarged scale of the main portion of the microphone assembly when in the folded position as illustrated in FIG. 2.
Figure 6:
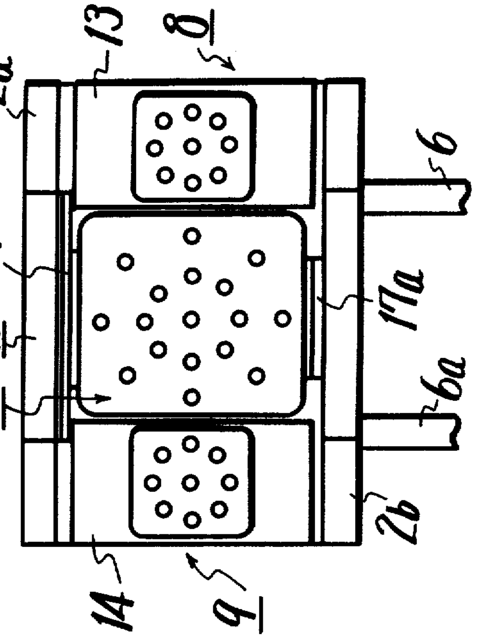
FIG. 6 is a front plan view in an enlarged scale of the microphone assembly of the invention.
Figure 7:
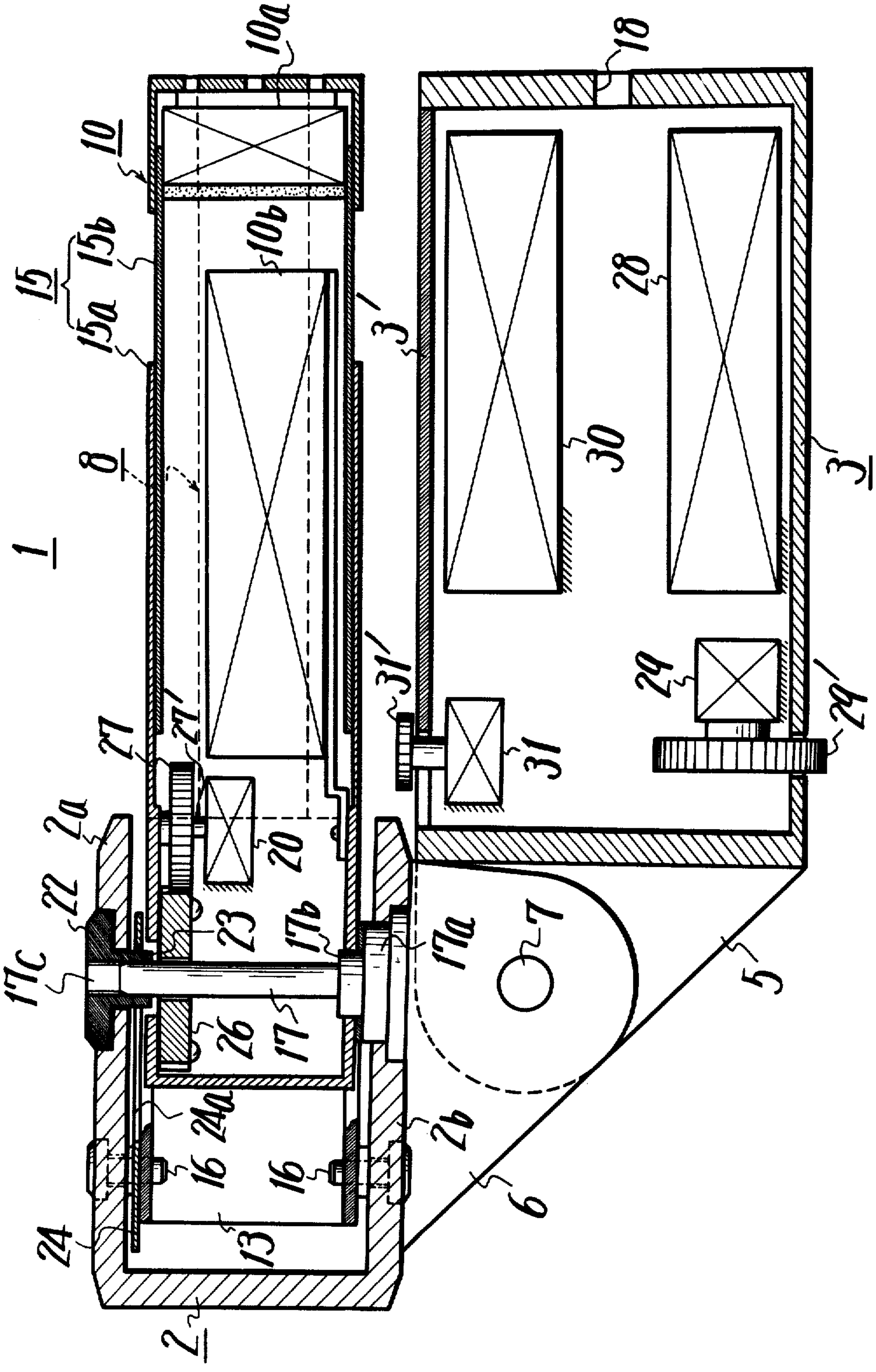
FIG. 7 is a cross-sectional view in an enlarged scale of the center portion of the microphone assembly when in the folded position.

FIGS. 4 through 7 illustrate a practical example of the interlocking device between the left and right microphones 8 and 9 as well as an example of the pan-pot volume potentiometer 20 and the various operating mechanisms and the inter-relationship among the other elements. FIG. 5 is an enlarged cross-sectional view of FIG. 2. FIG. 6 is an enlarged front view of FIG. 2 and FIG. 7 is an enlarged cross-sectional view of the center portion of FIG. 2. In all these views, the parts corresponding to those illustrated in FIGS. 1 through 3 are indicated with the same reference numerals.

In FIG. 7, the pivotal shaft 17 which rotatably supports the inner base portion of the outer speaker support 15*a* of the center microphone 10 includes a head 17*a* which is stepped to different diameters so that the head mates with a facing recess and center opening formed through the lower plate 2*b* of the frame support member 2. A disc shape receiving portion 17*b* abuts against the head portion 17*a* and an externally threaded portion 17*c* which theadedly receives a female threaded portion 22 which is attached to the upper plate 2*a* of the frame support member 2. The center microphone 10 is rotatably supported about the shaft 17 and is attached to the receiving portion 17*b*. As shown in FIG. 7, the female screw body 22 has a rectangular boss or guide 23 for guiding a slide plate 24 as shown in greater detail in FIG. 5. The guide 23 extends beyond the lower surface of the upper plate 2*a* of the frame support member 2 about the shaft 17.

In order to assure that the microphones 8 and 9 always rotate at the same angle but in the opposite direction as shown in FIGS. 5 and 7 due to a slide plate 24 shown in plan view in FIG. 5 which is adapted to move back and forth as indicated by the arrow $a_3$ relative to the rectangular guide 23 which is mounted in the slot 24*a* of the plate 24 which is supported on the shaft 17. The left and right microphones 8 and 9 are interlocked by means of the slide plate 24 as shown in FIG. 5 in that the slide plate 24 is of generally trapezoidal shape. A rectangular slot 24*a* which extends from near the right end relative to FIG. 5 to the left relative to FIG. 5 along a center axis thereof. A pair of rectangular slots 24*b* and 24*b*' are formed adjacent the left or larger end of the plate 24 as shown in FIG. 5 and extend generally in a direction at right angles to the longitudinal axis of plate 24 and are symmetrical with respect to the center axis. A pin 25 is mounted on the base end of the pivotal portion 13 of the left microphone 8 and is received in slot 24*b*. A corresponding pin 25' is attached to the base end of the pivotal portion 14 of the right microphone 9 and is received in slot 24*b*' as shown. Thus, when one of the microphones 8 or 9 is rotated about the shafts 16 or 16*a* in a direction toward or away from the center microphone 10, the other microphone will be rotated about its corresponding pivot shafts 16 or 16*a* in the opposite direction but at the same angle and in synchronism due to the action of the slide plate 24. FIG. 5 shows the relationship of the slide plate 24 when the microphones 8 and 9 are in the closed position and the slide plate will be moved to its extreme left position relative to FIG. 5 at this time. When the microphone arms 11 and 12 are pivoted away from each other to the position illustrated in FIG. 4, the pins 25 and 25' will move the slide plate 24 in the direction of the arrow indicated in FIG. 4 so that the slide plate moves to the right with the guide 23 moving in the slot 24*a*. Since the pins 25 and 25', the slots 24*b* and 24*b*' are of the same general shape, the microphone arms 11 and 12 will move the same angle when either of them is pivoted about its associated support shaft. It may be desirable in order to maintain the left and right microphones 8 and 9 at a desired fixed rotational position to provide suitable rotational friction which is actionable on the rotating portion of each microphone or alternatively a set screw may be provided which can lock the slide plate 24 at a fixed position relative to the guide 23. In FIG. 4, reference numeral 16' and 16'*a* designate the openings formed through the pivotal portions of the left and right microphone arms 11 and 12 through which the shafts 16 and 16*a* pass.

The pan-pot volume control 20 disclosed in FIG. 3 operates such that the degree of mixing of the output signal from the center microphone with the signals from the left and right microphones 8 and 9 varies in response to the rotational position of the center microphone 10. For this purpose, in the illustrated example as shown in FIGS. 5 and 7, a gear 26 is mounted on the inner surface of the upper plate of the outer portion 15*a* of the center microphone arm 15 and coaxial with the shaft 17. A pinion gear 27 having a suitable number of teeth is fixed to a shaft 27' which is rotatably supported by the outer portion 15*a* to the right relative to FIG. 7 of the gear 26 and meshes with the gear 26. The pan-pot volume control 20 is attached to the shaft 27' of the pinion gear 27. Thus, when the center microphone 10 is rotated relative to the center axis of the support member 2, the outer portion 15*a* rotates correspondingly and the pan-pot volume control 20 is varied by means of the gears 26, 27 and the shaft 27' so as to vary the degree of mixing of the output signal from the center microphone 10 to the outputs of the left and right microphones 8 and 9 as illustrated in FIG. 3. In other words, the wiper contact 20*a* will be rotated when the shaft 27' rotates and the housing of the potentiometer 20 will be attached to the wall of the member 15*a* and does not rotate and this provides relative motion between the wiper 20*a* and the resistance 20 illustrated in FIG. 3 to vary the mixing ratio of the center microphone with the other two microphones. As shown in FIG. 7, a mixing circuit 28 is provided in the handle member 3 and a volume control 29 for the fade-in and fade-out operation is provided which has a knob 29'. Knob 29' can be rotated from outside of the handle 3 because it extends through a slot formed in the side wall of the handle 3 as shown in FIG. 7 and may be of the sum-control type. That is a neutral index may be provided for the knob 29' which is marked on the outer surface of the handle 3 and corresponding markings are provided on the knob 29' so that different indicated rotational positions of the knob 29' relative to the handle index can indicate fade-in and fade-out positions. The handle member 3 is provided with an electrical power source 30 and a main volume control 31 which is provided with a suitable control knob 31' mounted outside the handle member 3.

The description above relates to a single preferred embodiment, however, the main feature of the present invention resides in the fact that the pair of left and right microphones and the center microphone are provided in connection with the base structure and the circuit which acts to mix the output signals from the center microphone with the signals from the left and right microphones and such structures are integrally formed. Since the microphone assembly in the present invention provides that the output signal from the center microphone can be distributed to the output signals of the left and right microphones according to the position of the center microphone, which has sharp directivity characteristics and is rotatably mounted between the left and right microphones it is possible to record sounds having superior localization characteristics. Also, with the present invention, the output signals from the left and right microphones and the signal from the center microphone are adjusted relative to each other to make it possible to achieve fade-in and fade-out operations and also the microphone assembly in convenient and compact. The single microphone assembly provides a very practical and advantageous unit.

It will be apparent that many modifications and variations can be effected by one skilled in the art without departing from the spirit and scope of the novel concepts of the present invention which is to be solely determined by the appended claims.

We claim as our invention:

1. A microphone assembly comprising:

(a) a pair of left and right microphones each capable of producing output signals, (b) a center microphone capable of producing an output signal located between said pair of left and right microphones;

(c) means for supporting said pair of left and right microphones and said center microphone:

(d) means for mixing an output signal from said center microphone with output signals from said left and right microphones, and in which said center microphone is pivotally supported by a part of said supporting means between said left and right microphones and moveable to various positions therebetween and wherein the mixing ratio of the output signal of said center microphone with the output signals from said left and right microphones can be varied by moving said center microphone to various positions between said left and right microphones.

2. A microphone assembly as claimed in claim 1, in which said center microphone has a sharper directivity characteristic than said left and right microphones.

3. A microphone assembly as claimed in claim 1, in which said pair of left and right microphones each have a microphone arm and a microphone element therein, said center microphone has a microphone arm and a microphone element therein, and said microphone arms of said left, right and center microphones are rotatably supported by said supporting means and wherein said arm of said center microphone and said arms of left and right microphones are rotatable to a stored position wherein they are substantially parallel with each other.

4. A microphone assembly as claimed in claim 3 further comprising an interlocking means for causing upon rotation of either of said arms of the pair of left and right microphones rotation of the other arm at the same angle.

5. A microphone assembly as claimed in claim 4, in which said interlocking means consists of a guide provided on a rotary shaft of said center microphone arm, a slide member, said slide member having a first elongated slot which engages said guide, and second and third symmetrical slots elongated in a direction perpendicular to the elongated direction of said first slot and a pair of pins each provided at one end of said left and right microphone arms and said pair of pins receivable in said second and third slots, respectively.

6. A microphone assembly comprising:

(a) a frame means;

(b) at least one pair of left and right microphone arms each of which has a microphone element rotatably supported by said frame member; and (c) handle means attached to said frame means, wherein said pair of microphone arms and said handle means are so mounted on said frame means that when said microphone assembly is not used said microphone arms and said handle means can be folded so as to be substantially parallel with each other.

7. A microphone assembly comprising:

(a) a frame member;

(b) a handle pivotally connected to said frame member on a first axis;

(c) first, second and third microphone arms including microphones pivotally connected to said frame member on second, third and fourth axes, respectively, which are normal to said first axis such that said handle and microphones can be pivoted to a stored position with the longitudinal axis of said handle parallel to the longitudinal axes of said first, second and third microphone arms.

8. A microphone assembly according to claim 7, wherein said second microphone arm is mounted between said first and third microphone arms and means for interconnecting and controlling said first and third microphone arms about said second and fourth axes such that if either is angularly rotated the other will angularly rotate the same angle but in the opposite direction.

9. A microphone assembly according to claim 8 including a combining potentiometer comprising a wiper contact engageable with a resistor and said second microphone connected to control the position of said wiper contact as said second microphone rotates about said third axis, the electrical output of said second microphone connected to said wiper contact, and the electrical outputs of said first and third microphones respectively supplied to opposite ends of said resistor, to develop left and right signals at opposite ends of said resistor.

* * * * *